United States Patent
Fiszman Dal Santo et al.

(10) Patent No.: US 7,531,200 B2
(45) Date of Patent: May 12, 2009

(54) METHOD OF PREPARING A FROZEN, BATTERED FOOD PRODUCT

(75) Inventors: Susana Fiszman Dal Santo, Valencia (ES); Ana Salvador Alcaraz, Valencia (ES); Teresa Sanz Taberner, Valencia (ES); Maria-Angeles Lluch Rodriguez, Valencia (ES); José-Vincente Castellano Belloch, Valencia (ES); José-Luis Camps Herrero, Valencia (ES); Manuel Gamero Castañer, Valencia (ES)

(73) Assignee: Alimentaria ADIN, S.A. (Spanish Society), Valencia (ES)

( * ) Notice: Subject to any disclaimer, the term of this patent is extended or adjusted under 35 U.S.C. 154(b) by 656 days.

(21) Appl. No.: 10/485,568

(22) PCT Filed: May 20, 2003

(86) PCT No.: PCT/ES03/00226

§ 371 (c)(1),
(2), (4) Date: Jul. 12, 2004

(87) PCT Pub. No.: WO03/101228

PCT Pub. Date: Dec. 11, 2003

(65) Prior Publication Data

US 2004/0241289 A1 Dec. 2, 2004

(30) Foreign Application Priority Data

Jun. 4, 2002 (ES) ................................ 200201276

(51) Int. Cl.
*A23L 1/0534* (2006.01)

(52) U.S. Cl. ....................... 426/552; 426/302; 426/305; 426/573

(58) Field of Classification Search ....................... None
See application file for complete search history.

(56) References Cited

U.S. PATENT DOCUMENTS

| | | | | |
|---|---|---|---|---|
| 4,900,573 A * | 2/1990 | Meyers et al. | ................ | 426/302 |
| 5,019,406 A * | 5/1991 | Ang et al. | .................... | 426/302 |
| 5,494,688 A * | 2/1996 | Rebstock et al. | .............. | 426/92 |
| 5,520,937 A * | 5/1996 | Yasosky et al. | ................ | 426/94 |
| 6,475,541 B1 * | 11/2002 | Ekhart et al. | ................... | 426/94 |

* cited by examiner

*Primary Examiner*—Lien Tran
(74) *Attorney, Agent, or Firm*—Wenderoth, Lind & Ponack, L.L.P.

(57) ABSTRACT

A method of preparing a frozen, batter-coated food product that eliminates pre-frying, which is the most problematic stage of the conventional industrial process for manufacturing frozen batter-coated food products. The food product is pre-dusted and a prepared batter is applied to the dusted food. The batter contains a cellulose derivative that enables the batter to coagulate in a hot water bath or in the presence of water vapor. The batter coating covering the food is coagulated in a hot water bath, the coagulated, batter-coated food is heated in a traditional, microwave or infrared oven so that the coagulated batter coating layer does not melt on cooling, and the product is then cooled and frozen.

19 Claims, No Drawings

METHOD OF PREPARING A FROZEN, BATTERED FOOD PRODUCT

OBJECT OF THE INVENTION

The present invention is a new process to prepare a frozen, batter-coated food product. The fundamental object of the invention is to eliminate the stage of the equivalent conventional production process in which the food product is pre-fried in oil.

The process of the invention is applicable to all types of foods that can be batter-coated, including pieces of fish and other sea creatures, meat products and vegetable products, etc.

BACKGROUND OF THE INVENTION

The frying of food is a technique which is widely used as a method of food preparation in Spain. Batter-coated products are the most-consumed food products prepared using this technique.

The highest quality of batter-coated products is achieved when the fried products are soft and moist inside and are covered with a crispy layer or coating on the outside.

The energy necessary for frying is provided by the hot oil and part of this is absorbed by the food, which increases the amount of calories provided to the consumers.

A way of reducing the absorption of oil during the frying of batter-coated products is to incorporate substances such as proteins or hydrocolloids into the batter paste. A related patent is U.S. Pat. No. 4,900,573, which proposes a formulation for batter coating that contains HPMC. This cellulose gives rise to a considerable reduction in oil-absorption by the food without losing the crispy quality desired by the consumer.

The use of microwave ovens has now become an alternative method to cook food, especially due to the lower fat content of the final product. Both in patent WO 0108513 and in WO 9303634 a batter-coated product is developed from a formulation that has celluloses incorporated. Said product is prepared in the traditional way (pre-frying in oil and freezing) while providing the advantage that for its final preparation it can be heated in a microwave oven without losing the textural characteristics desired by the consumer.

Once batter-coating formulations that reduce the absorption of oil in the food product have been developed and alternative methods to cook the final product have been studied, it would be desirable to find a process to replace the process of pre-frying in oil, which is the most problematic in the batter-coated product production process.

SUMMARY OF THE INVENTION

As stated above, the object of the invention is to eliminate the classic pre-frying in oil stage, with the problems derived therefrom. This is replaced by immersing the batter-coated product in a hot water bath. The cCoagulation of the batter coating is achieved thanks to the incorporation of celluloses in the formulation thereof. The celluloses used gel "per se" when immersed in a bath of hot water. An alternative method to prepare batter-coated food is thereby provided which, in addition to reducing the fat content of the final product, avoids the pre-frying stage, which is the most problematic part of the process.

In wider terms, the process of the invention consists of defrosting the substrate, pre-dusting, coating the substrate in batter, dripping off the excess, coagulating the batter coating in a hot water bath, heating and freezing.

As has previously been noted, the process is applicable to the batter coating of squid rings, onion rings, portions of fish, chicken, mushrooms, courgette, etc.

In all cases, before processing, the substrate can be either kept frozen, at a temperature of −18° C. or lower, or not.

Other features of the invention will become evident in the course of the present description and are set out in the attached claims.

PREFERRED EMBODIMENT OF THE INVENTION

Irrespective of the process itself, the participation of specific pre-dusting and batter-coating products is required.

The pre-dusting phase improves the adhesion of the batter coating to the substrate. The pre-dusting mixture is fundamentally composed of wheat flour.

As regards the composition of the powdered batter-coating mixture, this includes flours, starches, hydrocolloids, salt, leaveners and water. The flours used can be wheat flour, corn flour or mixtures of both. Preferably, the formulation of the powdered batter coating mixture can contain between 40 and 95% by weight of wheat flour. The wheat flour can be of just one type or a mixture of different types. The formulation of the powdered batter coating mixture can contain between 2 and 40% by weight of corn flour.

The starches could be wheat, corn or rice starches. Preferably, the proportion of starch present in the formulation of the batter coating can vary from 0.1 to 30% by weight.

The hydrocolloids present in the powdered batter mixture are those responsible for the coagulation thereof in a water bath, thus avoiding the stage of pre-frying in oil that is necessary to coagulate the batter coating in a conventional production process for batter-coated products. The composition of the powdered batter mixture used in the invention incorporates cellulose derivatives that gel in hot water. Preferably, it uses those cellulose derivatives which, at a concentration of 2% in water and a temperature between 15-25° C., give an apparent viscosity between 100 and 4000 cP (according to reference methods ASTM D1347 and ASTM D2363) and form a firm gel at temperatures of 55-90° C. More preferably, it uses those cellulose derivatives which, at a concentration of 2% in water and a temperature of between 14-25° C., give an apparent viscosity between 1100 and 2100 cP (according to reference methods ASTM D1347 and ASTM D2363) and form a firm gel at temperatures of 55-90° C.

The formulation of the powdered batter mixture may contain between 1 and 5% by weight of cellulose derivatives.

The salt is incorporated in the formulation to provide flavour and may be present in concentrations that vary between 1 and 10% by weight of the powdered batter mixture.

Bicarbonates and phosphates are the preferred leavening agents. Preferably, mixtures of bicarbonates and pyrophosphates which added together constitute between 2.5 and 6% by weight of the powdered batter are those that provide the desired sponginess to the final product.

For the preparation of the batter, the water must be at between 6 and 15° C. The prepared batter must be kept at 6-15° C. throughout the batter-coating process.

The viscosity of the prepared batter affects the texture, colour, aroma, batter adhesion to the substrate, oil absorption in the final frying performed by the consumer and crispiness of the final product. The solids content of the prepared batter paste is preferably 35-40% by weight. The appropriate apparent viscosity of the reconstituted batter paste can vary between 20,000 and 60,000 cP (Brookfield geometry, 2 rpm, spindle No.4), measured in a temperature range of 15-20° C.

Using these batter coating ingredients, the food to be batter-coated is pre-dusted, coated in the prepared batter paste and left to drip for a period of time that may vary between 5 and 10 seconds. Once the excess batter has dripped off, the batter-coated food product is immersed in a water bath at a temperature that may vary between 60 and 90° C. for a time of 10 to 45 seconds.

The cellulose derivative added to the formulation acts on immersing the batter-coated food product in the hot water bath, producing the coagulation of the batter coating. The gel formed according to this process is thermo-reversible—it melts on cooling—and the coagulated batter-coated food product is, therefore, subjected to heating.

The heating can be performed in a conventional, microwave or infrared oven. Preferably, in a conventional oven the coagulated batter-coated product will be heated for 1.5 to 5 minutes at a temperature between 200 and 280° C. Preferably, in a microwave oven the coagulated batter-coated product will be heated for 10 to 30 seconds at a power that may vary between 400 and 800 W. Preferably, in an infrared oven the coagulated batter-coated product will be heated for 3 to 8 minutes in a temperature range of 200-250° C.

After heating, the product thus produced is cooled, packaged and frozen for storing at temperatures of −18° C. or lower.

The final product produced by following the process of this invention has the same texture, taste and colour properties as a product produced by following the traditional process of pre-frying in oil, with the advantage that fats from the pre-frying stage are not incorporated into its composition. Another additional advantage of the process of this invention, perhaps one of the most important advantages at an industrial level, is the elimination of industrial fryers, thus saving energy, reducing the costs relating to oil, quality control and maintenance and elimination of the wastes, as well as avoiding the dangers entailed by working at such high temperatures and in the presence of gases originated by the overheating of oil.

EXAMPLE

Frozen batter-coated squid rings were prepared in accordance with the method of the invention, using the following stages:

The squid rings were pre-dusted.

They were then coated in the reconstituted batter which contains the ingredients set out in table 1.

Subsequently, the resulting coated product was coagulated in a water bath, followed by a heating stage.

Finally, it was frozen.

TABLE 1

| Table of components: | |
| --- | --- |
| Wheat flour | 79.3% |
| Wheat starch | 10% |
| Methylcellulose | 1.5% |
| Salt | 5.5% |
| Sodium glutamate | 0.6% |
| Sodium bicarbonate | 1.32% |
| Sodium pyrophosphate | 1.78% |

The product is manufactured in the following manner:
The squid rings are defrosted.
They are blanched by immersing them in boiling water.
They are pre-dusted.

The batter is prepared by beating the dry ingredients in table 1 with water at 10° C. in the proportion of 1:1.2 by weight.

The squid rings are coated in the batter, which is prepared and kept at 10-15° C., and are left to drip for between 5 and 10 seconds.

The rings are immersed in a hot water bath at 70-80° C. for 20-30 seconds.

The batter-coated squid rings are heated in a microwave oven for 20 seconds at 700 W.

The final product is frozen.

The invention claimed is:

1. Method of preparing a frozen-batter-coated food product which comprises:
   (a) preparing a batter by mixing a number of dry ingredients with water;
   (b) pre-dusting a food product to be batter-coated;
   (c) applying the prepared batter containing between 1 and 5% by weight of a cellulose derivative that coagulates in a hot water bath or in the presence of water vapor to the dusted food product to form a batter coating thereon;
   (d) coagulating the batter coating on the food product in a hot water bath, without pre-frying;
   (e) heating the coagulated, batter-coated food product in a conventional, microwave or infrared oven so that the coagulated batter coating layer does not melt on cooling due to thermo-reversibility; and
   (f) cooling and freezing the heated product.

2. Method of preparing a frozen-batter-coated food product according to claim 1, wherein the cellulose derivative at 2% by weight of concentration in water and a temperature between 15 and 25 degrees C. has an apparent viscosity between 100 and 4000 cP and forms a firm gel at a temperature between 55 and 90 degrees C.

3. Method of preparing a frozen-batter-coated food product according to claim 1, wherein the cellulose derivative at 2% by weight of concentration in water and a temperature between 15 and 25 degrees C. has an apparent viscosity between 1100 and 2100 cP.

4. Method of preparing a frozen-batter-coated food product according to claim 1, wherein the batter contains wheat flour.

5. Method of preparing a frozen-batter-coated food product according to claim 1, wherein the batter contains a thermally treated wheat flour.

6. Method of preparing a frozen-batter-coated food product according to claim 1, wherein the batter contains a gluten-free flour.

7. Method of preparing a frozen-batter-coated food product according to claim 1, wherein the batter contains between 40% and 95% by weight of flour.

8. Method of preparing a frozen-batter-coated food product according to claim 1, wherein the batter contains between 0.1% and 30% by weight of starch.

9. Method of preparing a frozen-batter-coated food product according to claim 1, wherein the batter contains a leavening mixture of bicarbonate and phosphates that together constitute between 2.5 and 6% by weight.

10. Method of preparing a frozen-batter-coated food product according to claim 9, wherein the phosphates in the leavening mixture may or may not be a binary mixture of phosphates.

11. Method of preparing a frozen-batter-coated food product according to claim 1, wherein the batter contains salt, flavorings and/or colorings.

12. Method of preparing a frozen-batter-coated food product according to claim 1, wherein all the dry batter ingredients are mixed with running water so that the total solids range from 35 to 45% by weight.

13. Method of preparing a frozen-batter-coated food product according to claim 12, wherein the running water for the batter is at a temperature between 6 and 15 degrees C.

14. Method of preparing a frozen-batter-coated food product according to claim 12, wherein the prepared batter is kept at a temperature between 6 and 15 degrees C. throughout the batter-coating process.

15. Method of preparing a frozen-batter-coated food product according to claim 12, wherein the prepared batter mixture has an apparent viscosity between 20,000 and 60,000 cP when measured at between 15 and 20 degrees C.

16. Method of preparing a frozen-batter-coated food product according to claim 12, wherein the batter-coated food is immersed in a water bath at a temperature between 60 and 90 degrees C. for a time between 10 and 45 seconds, which creates a coagulated exterior layer by gelling the batter as a result of the properties of the cellulose derivative in the batter mixture.

17. Method of preparing a frozen-batter-coated food product according to claim 1, wherein after coagulating the batter by immersion in the water bath, the coagulated batter-coated food product is heated in a microwave oven for a time between 10 and 30 seconds at a power between 400 and 800 watts.

18. Method of preparing a frozen-batter-coated food product according to claim 1, wherein after coagulating the batter by immersion in the water bath, the coagulated batter-coated food product is heated in a conventional oven for a time between 1.5 and 5 minutes at a temperature between 200 and 280 degrees C.

19. Method of preparing a frozen-batter-coated food product according to claim 1, wherein after coagulating the batter by immersion in the water bath, the coagulated batter-coated food product is heated in an infrared oven for a time between 3 and 8 minutes at a temperature between 200 and 250 degrees C.

\* \* \* \* \*